C. R. Rand.
Heating Furnace.

No. 72229.     Patented Dec. 17, 1867.

Witnesses
P. T. Dodge
S. W. Velie

Inventor
C. R. Rand
by Dodge & Mann
his Attorneys

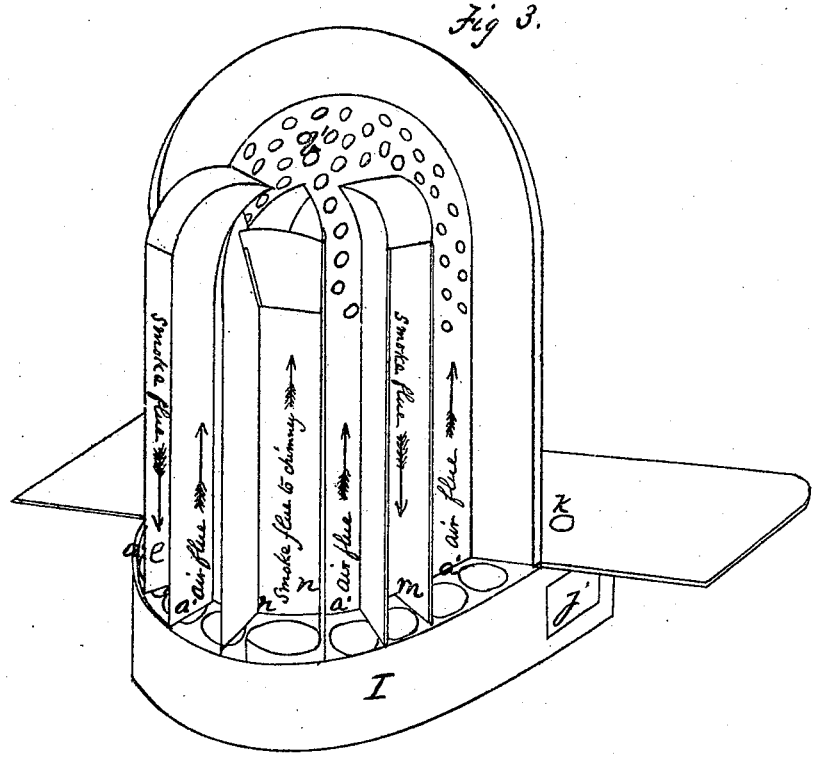
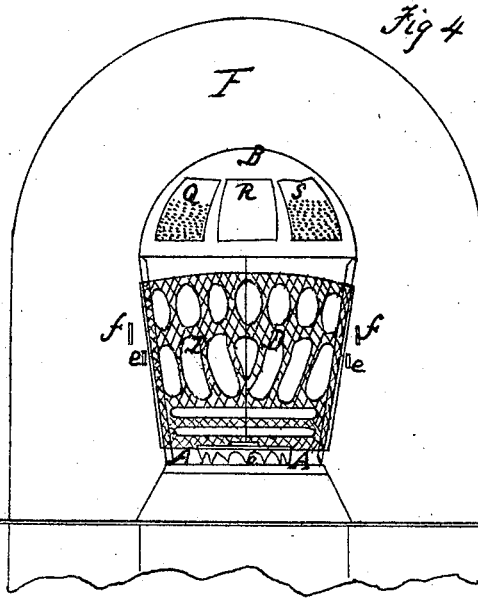

C. R. Rand.
Heating Furnace.

Nº 72229  Patented Dec. 17, 1867.

Witnesses
P. T. Dodge
S. H. Velie

Inventor
C. R. Rand
by Dodge & Munn
his Attorneys

United States Patent Office.

C. R. RAND, OF ST. LOUIS, MISSOURI.

*Letters Patent No. 72,229, dated December 17, 1867.*

HEATING-FURNACE.

The Schedule referred to in these Letters Patent and making part of the same.

TO ALL WHOM IT MAY CONCERN:

Be it known that I, C. R. RAND, of the city of St. Louis, in the county of St. Louis, and State of Missouri, have invented certain new and useful Improvements in Heating-Furnaces; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to air-heating furnaces, and consists of new and useful improvements for heating air, which may be distributed in several rooms at once; also in new and useful improvements in the fire-grate, and in the mode of arranging the different parts of the furnace. In the drawings—

Figure 3 is a rear elevation with the back portion of the case removed.

Figure 4 is a front elevation with shutters removed.

Figure 6:
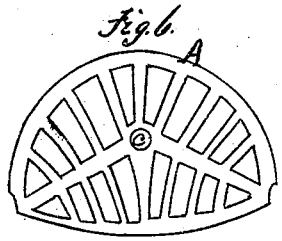
Figure 7:
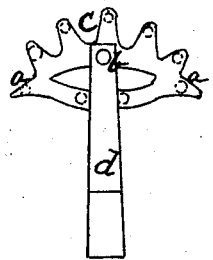
Figure 8:
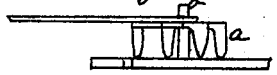

Figures 6, 7, and 8 are views of parts detached.

Figure 1:
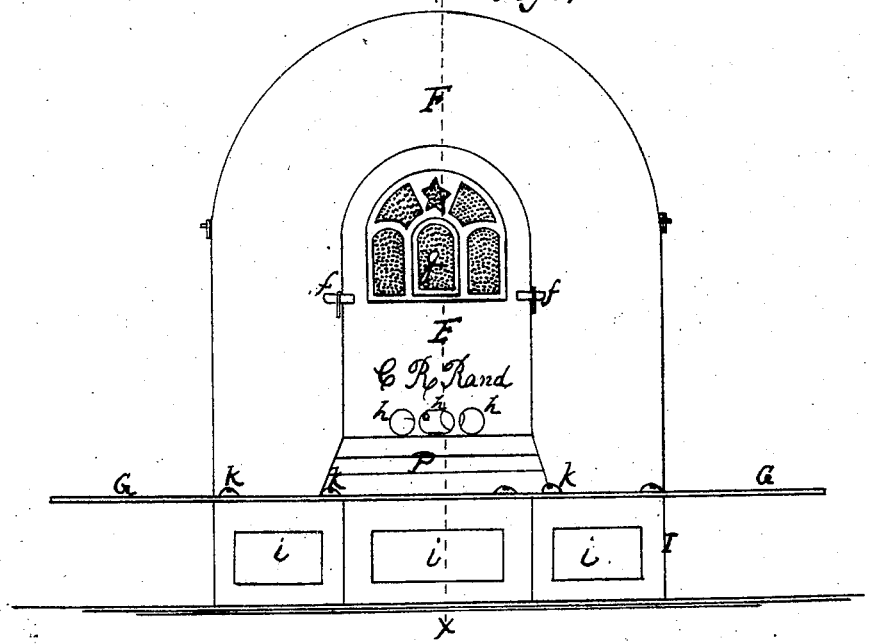
Figure 1 is a front elevation of furnace closed.
Figure 2:
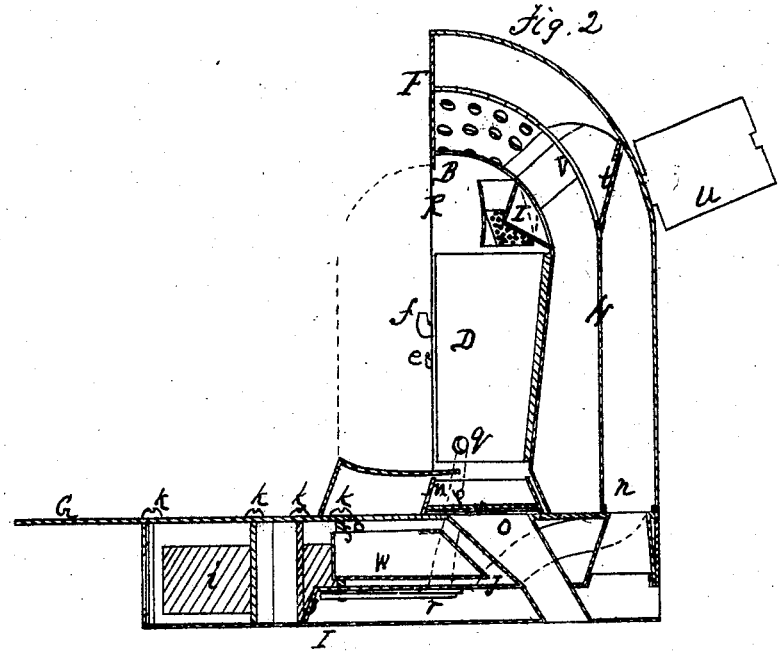
Figure 2 is a sectional view on the line $x\ x$ of fig. 1.
Figure 5:
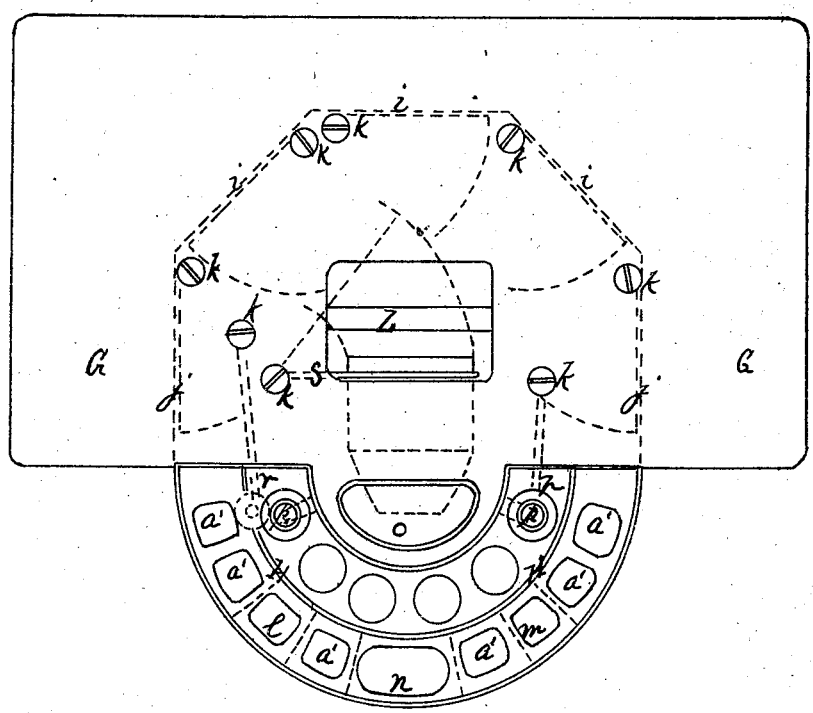
Figure 5 is a sectional view on the line $y\ y$ of fig. 1.

I construct my furnace in the form shown in figs. 1, 2, 3, and 4. The recess for the fire-grate A, I make in the form of a half cone, with a globe-top, B. Over the fire-grate A, I place the shaker-grate C, having points $a$, as shown in figs. 4 and 8, and also provided with a pivot, $b$, to fit into and turn in the socket $c$ of the fire-grate A, as shown in figs. 6 and 8, as well as a handle, $d$, for turning it. This handle is made long enough to project out sufficiently far to be used conveniently in shaking the fire whenever the grate becomes clogged with ashes, cinders, or clinkers. The inside of the furnace I line with fire-brick or fluted iron, D, as shown in figs. 2 and 4. Immediately in front of the fireplace, and for the purpose of confining the coal or other material used for fire, I place, in a vertical position, a grate having projections in either side, to fit into catches $e$ in the frame of the furnace, as shown in fig. 4. Over the whole front of the fireplace I place a shutter, E, having projections to fit into the catches $f$ in the frame of the furnace, and also having its upper portion perforated or made with openings into which isinglass may be fitted, and also a door, $g$, as shown in fig. 1, and three holes $h$, near the bottom, in which a sliding damper is placed, as shown in fig. 1. The front face F of the furnace, I make in the form shown in fig. 1, and extend the hearth-plate G, as shown in the same figure. The space between the rear of the fireplace and the rear wall of the furnace, I divide into two parts by running a partition, H, equidistant between them, and extending it from the front face F to the hearth-plate G, as shown in fig. 2. And in the space between this partition H and the rear wall of the furnace, I place smoke and air-flues, as shown in fig. 3, and make openings in the hearth-plate G, immediately under and corresponding with them. Under the hearth-plate G, I make a suitable-sized chamber, I, as shown in figs. 1, 2, and 3, having its front side octagonal, and showing five of the octagonal faces, and the rear side circular, corresponding with the rear edge of the hearth-stone and rear wall of the furnace. In each one of the octagonal faces I make an opening, and provide it with a door or shutter, as shown in figs. 1, 2, 3, and 5. The three openings $i$, immediately in front, are for the purpose of allowing the hot air to flow out into the room when their shutters are opened. The two openings $j$, fig. 5, are for the purpose of introducing cold air into the furnace. Each of these shutters for closing these openings is attached to a shaft having one end in the floor of the chamber, and then projecting through the hearth-plate G. The end projecting through the hearth, I provide with a slotted flat-rounded head, $k$, as shown in figs. 1, 2, 3, so that the shutters may be readily turned by a common hook or key fitting into the slots. Through the centre of the chamber I, and in a line parallel with its upper and lower sides, I place a partition, J, fig. 2, and extend it from the rear side of the chamber I, forward of the openings $j$ in the side of the chamber I, for the reception of cold air, and then vertically to the floor of the chamber, thus separating the hot and cold-air chambers. Within the space enclosed by the partition J and the floor of the chamber I, and through which the cold air passes, I partition off another small chamber, large enough to receive the smoke from the smoke-flues $l\ m$, which pass down the rear side of the partition H, as shown in fig. 3, and are continued through the hot-air chamber to this smoke-chamber, and also to receive the smoke-flue $n$ leading to the chimney, as well as the pipe O, fig. 2, for conveying the ashes from the grate to the ash-pit. The space between the hearth-plate G, and that part of the partition J lying between the rear wall of the furnace and a continuation vertically of the front face F, I also partition by extending the partition H vertically to the partition J, and by extending, on either side of the fire-recess, that part of the front face F between the partition H and the rear wall of the furnace vertically to the partition J. Through this chamber thus made the smoke-flues $l$, $m$, and $n$ pass, as shown in fig. 5. In the partition J, I place two pipes, $p$, one on either side of the fire-recess, carry them upward, and have their ends enter into the fire-recess at $q$, as shown in fig. 2. These pipes $p$ lead direct from the cold-air chamber to the fireplace. I regulate the passage of the air through the pipes $p$, by means of the dampers $r$, which fit over and close their openings into the cold-air chamber, as shown in figs. 2 and 5, and are moved by a hook or key fitting into the slotted heads $k$, in the same manner that the other dampers are moved. Between the hearth-plate G and the partition J, I place a receptacle, W, fig. 2, for water, and attach it to a crane, S, as shown in figs. 2 and 5, and so that it may be swung round under an opening, L, in the hearth-plate G, as shown in fig. 5, for convenience in filling with water, and then swung, if desired, immediately under the fire, by the slotted head $k$, and in the same manner that the dampers are turned. Under the opening L in the hearth-plate G, and in the partition J, I make another opening, not shown in the drawings. This opening is into the smoke-chamber, and is for the purpose of affording easy access to it for cleaning and removing the soot or other matter when desired. Both openings have close-fitting covers. Immediately under the grate A, I place a closely fitting ash-pan, M, with a sliding bottom, N, which may be readily drawn out, as shown in fig. 5. When drawn out the ashes fall into the ash-pipe O, as shown in figs. 2 and 5, and pass into the ash-pit in the cellar or wherever the receptacle for them may be placed. Around the ash-pan M, and covering it, I place an ornamental fender, P, which, in connection with the shutter E, closes the whole front, as shown in fig. 1. In the top of the fire-place or chamber, I make three openings, Q R S, as shown in fig. 4. Over the middle opening R, I place a cover, T, fig. 2, having an angular face to divide the smoke which passes through the openings Q S, which are provided with perforated screens to arrest the sparks. The cover T may be removed when it is desired to clean the flue behind it. The smoke and heat pass through the openings Q S, fig. 4, into the flues $l$ $m$, fig. 3, which conduct it down into the smoke-chamber beneath the partition J, fig. 2, then it passes into the chimney smoke-flue $n$ of fig. 3, and out through the perforated screen U in the rear wall of the furnace to the chimney, as shown in fig. 2. At the top of the smoke-flue $n$ there is a movable slide, $t$, and immediately opposite, in the partition H, there is an opening, V, fig. 2, corresponding to the opening R in the upper side of the fireplace, so that by removing the cover on R, the movable slide $t$ may be reached and removed, and thus access had to the chimney through these openings whenever desired for cleaning or other purposes. By opening the shutters $j$ on either side of the furnace, as shown in figs. 3 and 5, the cold air passes into the chamber, between the bottom of the furnace and the partition J, then up through the holes or openings in the partition J, between partition H and the rear wall of the furnace, then up into the air-flues $a'$, as shown in fig. 3, and through the perforations $b'$ in the upper rounded portion of the partition H, as shown in fig. 3, then down between the partition H and rear side of the fireplace to the chamber between the hearth-plate G and the partition J. As the partition J only extends horizontally forward as far as the red dotted line, fig. 5, and then extends vertically downward to the bottom floor of the furnace, the whole front of this chamber becomes filled with hot air, and may be allowed to flow out into different rooms through the openings $i$, fig. 1, by turning the shutters. It will be noticed that after the cold air is let into the chamber beneath the partition J, by turning the dampers $r$, fig. 5, a portion of it will flow up through the pipes $p$ directly into the fire through the holes $q$, and thus increase the draught as well as the intensity of the fire; and that the balance of the air in its passage through the furnace is constantly passing along flues and chambers that are more or less directly heated by the fire itself, or by the heat accompanying the air and smoke from the fire to the chimney. By this arrangement I am enabled to utilize nearly all the heat produced by the fire, and distribute it as may be desired. By means of the closely fitting shutter E, the room in which the furnace is placed is kept free from dust and ashes, whenever the shaker-grate is used or the ashes removed, by withdrawing the ash-pan M or the slide N. The hot air can always be kept sufficiently charged with moisture by regulating the position of the water-vessel W. This vessel may be kept immediately under the furnace or moved away from it.

Having thus described my invention, what I claim, is—

1. The shaker-grate C, provided with the points $a$ and pivot $b$, arranged to rest upon the grate A, and operate substantially as described and for the purpose set forth.

2. The smoke-flues $l$ $m$ $n$, and air-flues $a'$, in connection with the hot and cold-air chambers, and the dampers $i$, $j$, and $r$, and pipes $p$, when arranged to operate substantially as described.

3. The water-vessel W, in connection with the crane S, when arranged to operate substantially as described.

4. The ash-pan M, with its sliding bottom N, in connection with the pipe O, when arranged to operate as shown and described.

5. The openings R V $t$ for obtaining access to the chimney, and the opening Z in the hearth-plate, in connection with the opening in the partition J, with their movable covers, when arranged as described and for the purposes set forth.

6. The half conical form of fireplace, with globe-top, having the divisions therein for the air-flues as shown, as well as the arrangement for dividing the smoke, with the shutter E, provided with the door $g$, and damper $h$, when arranged as described and for the purposes set forth.

C. R. RAND.

Witnesses:
E. W. PATTISON,
WILLIS N. BRENT.